US012556383B2

(12) United States Patent
Soulhi et al.

(10) Patent No.: US 12,556,383 B2
(45) Date of Patent: Feb. 17, 2026

(54) SYSTEMS AND METHODS FOR UTILIZING MACHINE LEARNING MODELS TO GENERATE ENCRYPTION KEYS

(71) Applicant: Verizon Patent and Licensing Inc., Basking Ridge, NJ (US)

(72) Inventors: Said Soulhi, Saint Cloud, FL (US); Adam Barron, Leesburg, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 186 days.

(21) Appl. No.: 18/602,297

(22) Filed: Mar. 12, 2024

(65) Prior Publication Data
US 2025/0293868 A1    Sep. 18, 2025

(51) Int. Cl.
*H04L 9/08* (2006.01)
(52) U.S. Cl.
CPC .................. *H04L 9/0861* (2013.01)
(58) Field of Classification Search
CPC ..................................... H04L 9/0861
USPC .............................................. 713/171
See application file for complete search history.

(56) References Cited

PUBLICATIONS

Eastlake et al., "Randomness Requirements for Security," Network Working Group, Standards Track, Jun. 2005, 48 Pages.
"Entropy Assessment," NIST SP 800-90B, Website: https://github.com/usnistgov/SP800-90B_EntropyAssessment, Oct. 30, 2023, 5 Pages.
Faz-Hernandez et al., "Hashing to Elliptic Curves," Internet Research Task Force (IRTF), RFC 9380, Aug. 2023, 145 Pages.
Barker et al., "Recommendation for Key-Derivation Methods in Key-Establishment Schemes," NIST Special Publication 800-56C, Revision 2, Aug. 2020, 41 Pages.
Abdalla et al., "CPace, a balanced composable PAKE," Network Working Group, Website: https://datatracker.ietf.org/doc/draft-irtf-cfrg-cpace/, Sep. 25, 2023, 87 Pages.

*Primary Examiner* — Linglan Edwards
*Assistant Examiner* — Phuc Pham

(57) ABSTRACT

A device may receive input key material, and may process the input key material, with a trained generative adversarial network (GAN) model, to generate an encryption key with a maximized entropy. The trained GAN model may include a key generator network model trained to generate encryption keys that generalize key derivation functions with higher entropy to enhance cryptographic security, and a key discriminator network model trained to predict authenticities of the encryption keys generated by the key generator network model. The device may perform one or more actions based on the encryption key.

20 Claims, 11 Drawing Sheets

SYSTEMS AND METHODS FOR UTILIZING MACHINE LEARNING MODELS TO GENERATE ENCRYPTION KEYS

BACKGROUND

A general adversarial network (GAN) model is a deep learning architecture that trains a generative neural network model and a discriminator neural network model to compete against each other to improve the generative ability of the generative neural network.

DETAILED DESCRIPTION OF EXAMPLE EMBODIMENTS

Figure 1A:
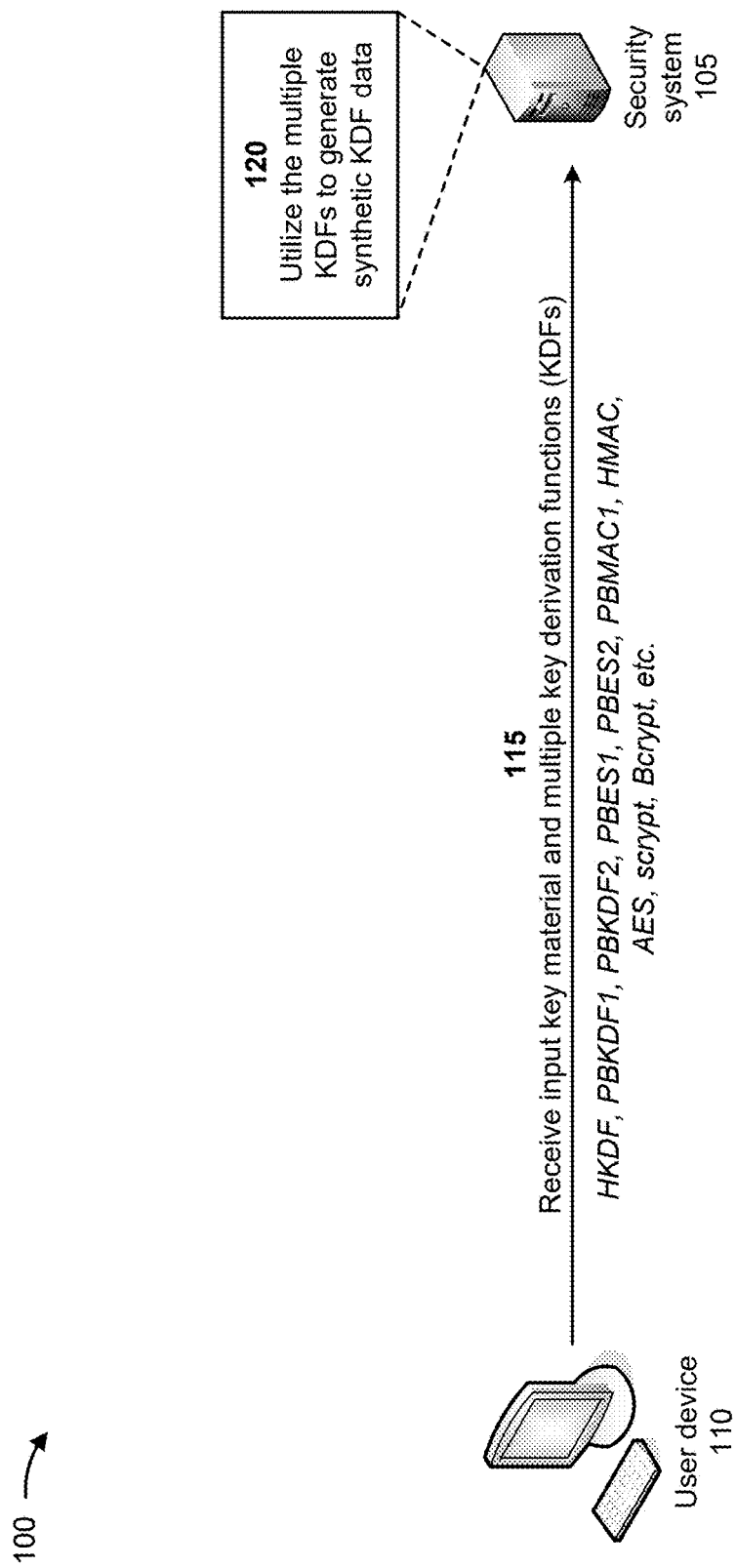
FIGS. 1A-1G are diagrams of an example associated with utilizing a GAN model to generate encryption keys with maximum entropy.

The following detailed description of example implementations refers to the accompanying drawings. The same reference numbers in different drawings may identify the same or similar elements.

Cryptographic systems rely on the generation of secret information, such as passwords and cryptographic keys, to maintain security. However, traditional techniques for generating secret information using pseudo-random processes may be susceptible to various vulnerabilities. Attackers can exploit the predictability of pseudo-randomly generated encryption keys by reconstructing an environment in which the encryption keys were produced, or by applying quantum computing techniques to facilitate decryption of the keys. Achieving sufficient randomness and unpredictability (e.g., entropy) in the generation of secret information is a non-trivial task that has significant implications for the security of cryptographic systems. Additionally, the low entropy and poor randomness of user-provided passwords make the passwords unsuitable for use as cryptographic keys. Thus, current techniques for generating secure information consume computing resources (e.g., processing resources, memory resources, communication resources, and/or the like), networking resources, and/or other resources associated with failing to prevent advanced attacks on secure information, failing to eliminate vulnerabilities introduced into the secure information, handling loss of the secure information to bad actors, failing to identify and prevent attacks on the secure information, and/or the like.

Some implementations described herein relate to a security system that utilizes a GAN model to generate encryption keys with maximum entropy (entropy in a cipher's key is a key strength in bits that measures how difficult it is to break the cipher via brute force). For example, the security system may receive input key material and multiple key derivation functions (KDFs), and may utilize the multiple KDFs to generate synthetic KDF data. A KDF is a cryptographic algorithm that derives one or more secret keys from a secret value (e.g., a master key, a password, a passphrase, and/or the like) to be secured. The security system may process the input key material, a loss function, and noise, with a key generator network model, to generate an encryption key, where the key generator network model is part of a GAN model that includes a key discriminator network model. The security system may process the synthetic KDF data and the encryption key, with the key discriminator network model, to determine that the encryption key is a fake key. The security system may update the key generator network model based on determining that the encryption key is a fake key, and may generate another encryption key with the updated key generator network model and the input key material. The security system may process the synthetic KDF data and the other encryption key, with the key discriminator network model, to determine that the other encryption key is a real key, and may output a trained GAN model based on determining that the other encryption key is a real key.

In this way, the security system utilizes a GAN model to generate encryption keys with maximum entropy. For example, the security system may include a key generator network model of a GAN model that generates encryption keys with increased entropy based on input key material and noise data. The GAN model may be trained to produce encryption keys that generalize KDFs with higher entropy to enhance cryptographic security of the encryption keys. The security system may include a key discriminator network model of the GAN model that updates the key generator network model to iteratively increase the entropy of generated encryption keys. The security system may enhance the randomness and unpredictability in encryption key derivation and may improve security and performance of the encryption keys. Thus, the security system may conserve computing resources, networking resources, and/or other resources that would have otherwise been consumed by failing to prevent advanced attacks on secure information, failing to eliminate vulnerabilities introduced into the secure information, handling loss of the secure information to bad actors, failing to identify and prevent attacks on the secure information, and/or the like.

FIGS. 1A-1G are diagrams of an example 100 associated with utilizing a GAN model to generate encryption keys with maximum entropy. As shown in FIGS. 1A-1G, the example 100 includes a security system 105 associated with a user device 110. The security system 105 may include a system that utilizes a GAN model to generate encryption keys with maximum entropy. The user device 110 may include a communication device and/or a computing device. Further details of the security system 105 and the user device 110 are provided elsewhere herein.

As shown in FIG. 1A, and by reference number 115, the security system 105 may receive input key material and multiple KDFs. For example, a user of the user device 110 may cause the user device 110 to generate the input key material and the multiple KDFs. The user device 110 may provide the input key material and the multiple KDFs to the security system 105, and the security system 105 may receive the input key material and the multiple KDFs from the user device 110. In some implementations, the security system 105 may already store the multiple KDFs in a data structure (e.g., a database, a table, a list, and/or the like) associated with the security system 105, and may not receive the multiple KDFs from the user device 110.

In some implementations, the input key material may include material from one or more language dictionaries, generic strings composition rules (e.g., generic permutations), or personalized strings composition rules (e.g., personalized data permutations). A KDF may include a function of four arguments: a keying material (e.g., the input key material), a salt (e.g., randomly generated for additional randomness), additional information associated with context (e.g., application specific information), and a desired output key material length. KDFs may utilize pseudorandom functions, hash functions, block ciphers, and/or the like. In some implementations, each of the KDFs may include a hash message authentication code (HMAC)-based KDF (HKDF), a password based KDF 1 (PBKDF1), a password based KDF 2 (PBKDF2), a password-based encryption scheme 1 (PBES1) KDF, a password based encryption scheme (PBES2) KDF, a password based message authentication code 1 (PBMAC1) KDF, an HMAC, an advanced encryption standard (AES) KDF, a scrypt KDF, a Bcrypt KDF, and/or the like.

As further shown in FIG. 1A, and by reference number 120, the security system 105 may utilize the multiple KDFs to generate synthetic KDF data. For example, the security system 105 may utilize the multiple KDFs to generate encryption keys (e.g., synthetic encryption keys that correspond to the synthetic KDF data). In some implementations, the security system 105 may provide key material (e.g., similar to the input key material), a salt (e.g., randomly generated for additional randomness), information (e.g., application specific information), and a length (e.g., a desired key length) to one of the multiple KDFs (e.g., an HKDF). The HKDF may utilize the key material and the salt to extract a pseudo-random key (PRK), and may expand the pseudo-random key, the information parameter, and a counter (e.g., from 0 to 255) to derive encryption keys (e.g., secret keys typically used with symmetric cryptography). In some implementations, the security system 105 may utilize the key material, the salt, the information, and the length with the other multiple KDFs to generate additional encryption keys (e.g., the synthetic KDF data).

Figure 1B:
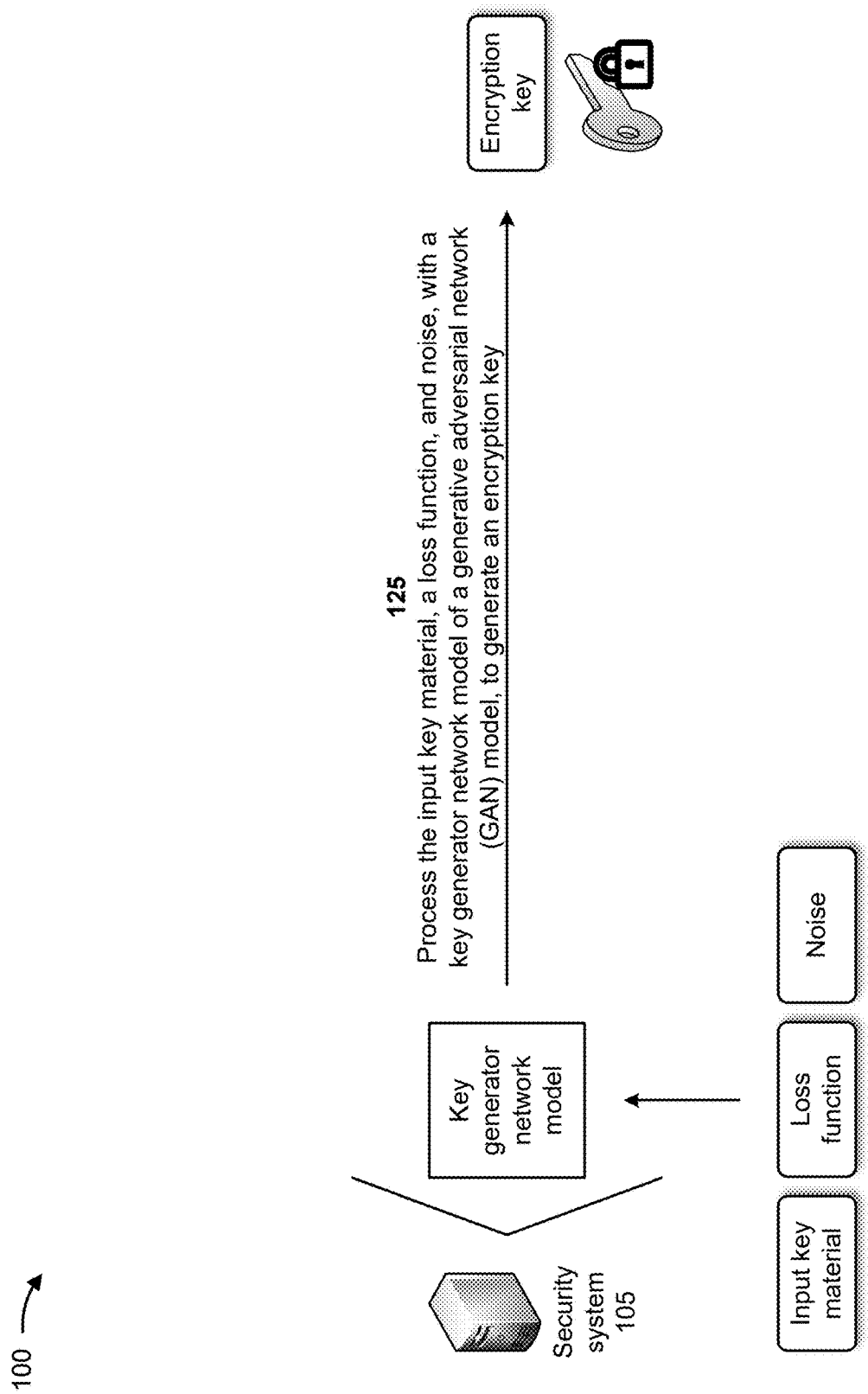

As shown in FIG. 1B, and by reference number 125, the security system 105 may process the input key material, a loss function, and noise, with a key generator network model of a GAN model, to generate an encryption key. For example, the security system 105 may be associated with a GAN model that includes a key generator network model and a key discriminator network model. In some implementations, the GAN model may include a vanilla GAN model, a Hellinger GAN model, a Wasserstein GAN model, a Sinkhorn GAN model, a total variation (TV) GAN model, a cumulant GAN model, and/or the like. In some implementations, the loss function may include a loss function that is based on parameterized Renyi entropy, a Kullback-Leibler divergence loss function, a Jensen-Shannon divergence loss function, a Wasserstein loss function, and/or the like. Renyi entropy is a continuous spectrum of entropies specified by a parameter ($\alpha$), where lim $\alpha \rightarrow 1$ is Shannon entropy, lim $\alpha$=infinity is a minimum entropy, and lim $\alpha$=zero is log (n), (where n is a number of non-zero probabilities). Renyi entropy is a decreasing function of $\alpha$, and minimum entropy is the most conservative measure of entropy and may be the best to use for cryptographic evaluation. Renyi minimum entropy models a basic notion of an attacker (e.g., a one-try eavesdropper that attempts to infer a secret from observable behavior and with a limitation that can be tried only once). The noise may include Gaussian noise, thermal noise, intermodulation noise, cross-talk noise, impulse noise, shot noise, and/or the like. In some implementations, security system 105 may incorporate the noise into the input key material.

The key generator network model may utilize the input key material, the loss function, and the noise to generate the encryption key. In some implementations, the key generator network model may utilize just the input key material to generate the encryption key. The security system 105 may train the key generator network model, with the input key material, the loss function, and the noise, to learn a data distribution and to generate fake encryption keys as close as possible to a real encryption key.

Figure 1C:
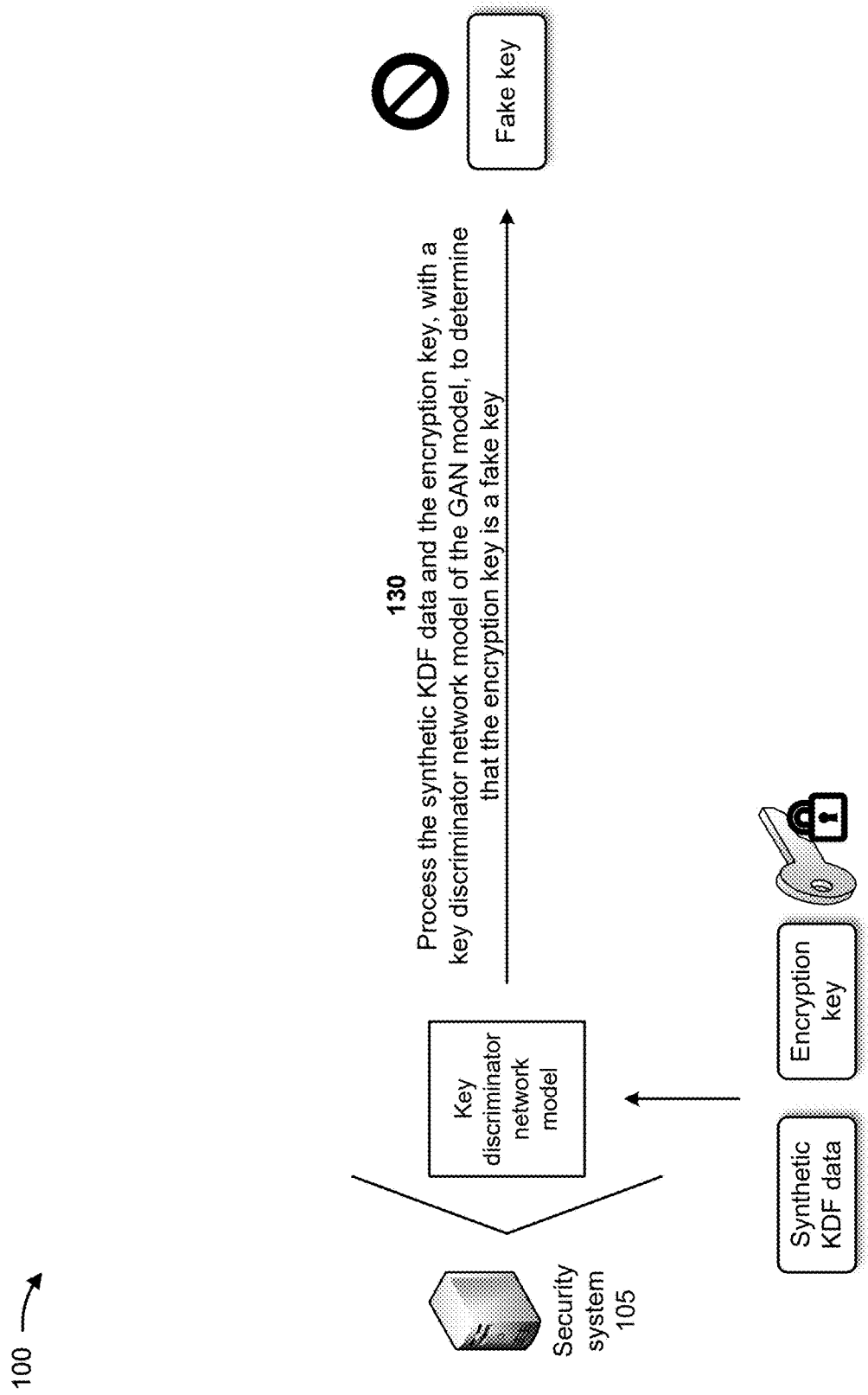

As shown in FIG. 1C, and by reference number 130, the security system 105 may process the synthetic KDF data and the encryption key, with the key discriminator network model of the GAN model, to determine that the encryption key is a fake key. For example, security system 105 may train the key discriminator network model, with the synthetic KDF data and the encryption key, to learn how to distinguish a fake key from a real key and to learn the multiple KDFs. In some implementations, the security system 105 may process the synthetic KDF data and the encryption key, with the key discriminator network model, to determine whether the encryption key is a fake key or a real key. In some implementations, the key discriminator network model may determine that the encryption key is a fake key. Alternatively, the key discriminator network model may determine that the encryption key is a real key. When the encryption key is determined to be a real key, training may be complete for the GAN model, as described elsewhere herein.

Figure 1D:
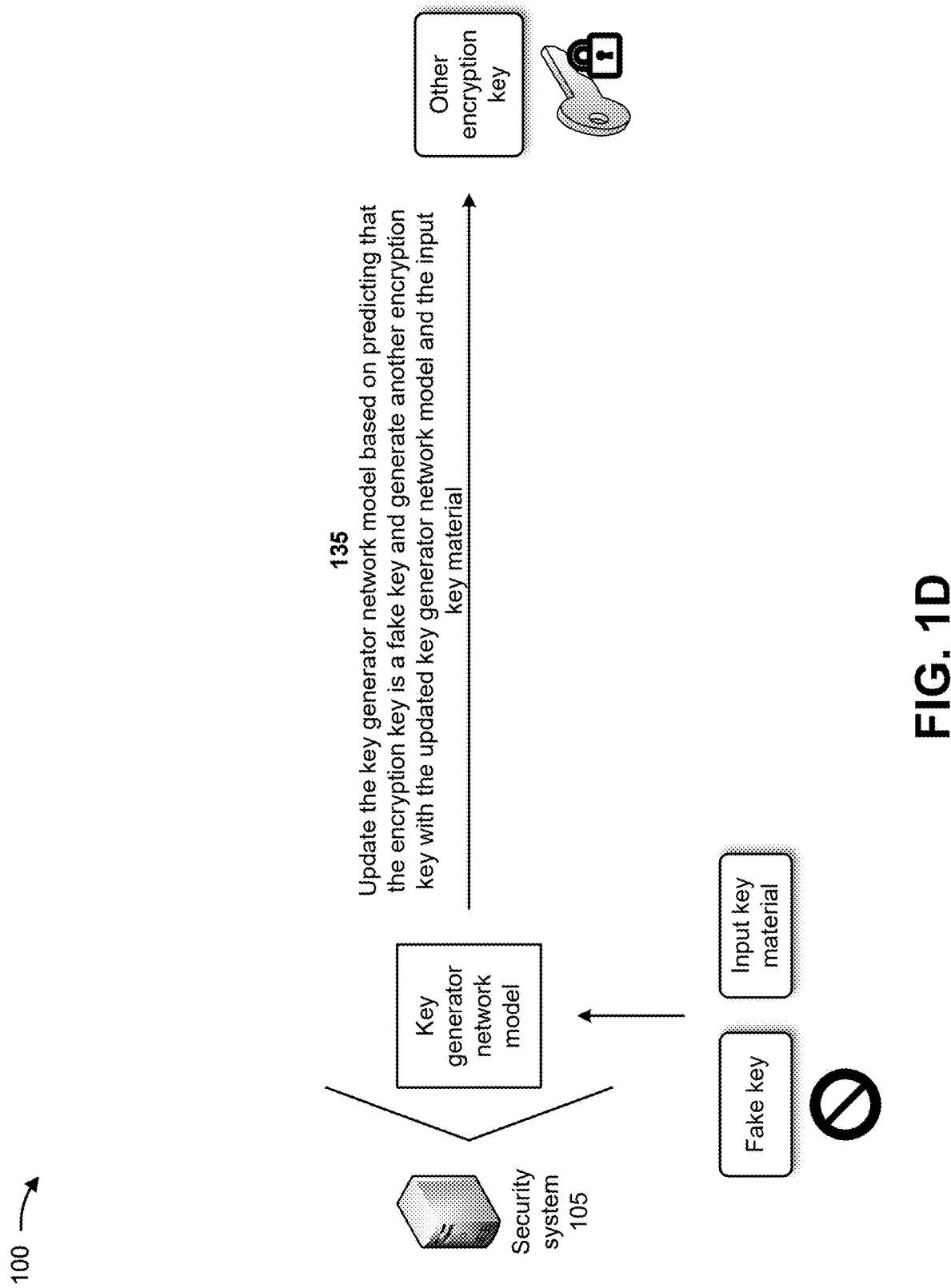

As shown in FIG. 1D, and by reference number 135, the security system 105 may update the key generator network model based on determining that the encryption key is a fake key and may generate another encryption key with the updated key generator network model and the input key material. For example, when the key discriminator network model determines that the encryption key is a fake key, the security system 105 may update the key generator network model to generate encryption keys that are less fake and/or may update the key discriminator network model to improve determination of whether an encryption is a fake key or a real key. In some implementations, after updating the key generator network model and/or the key discriminator network model, the security system 105 may process the input key material, the loss function, and the noise, with the updated key generator network model, to generate the other encryption key.

Figure 1E:
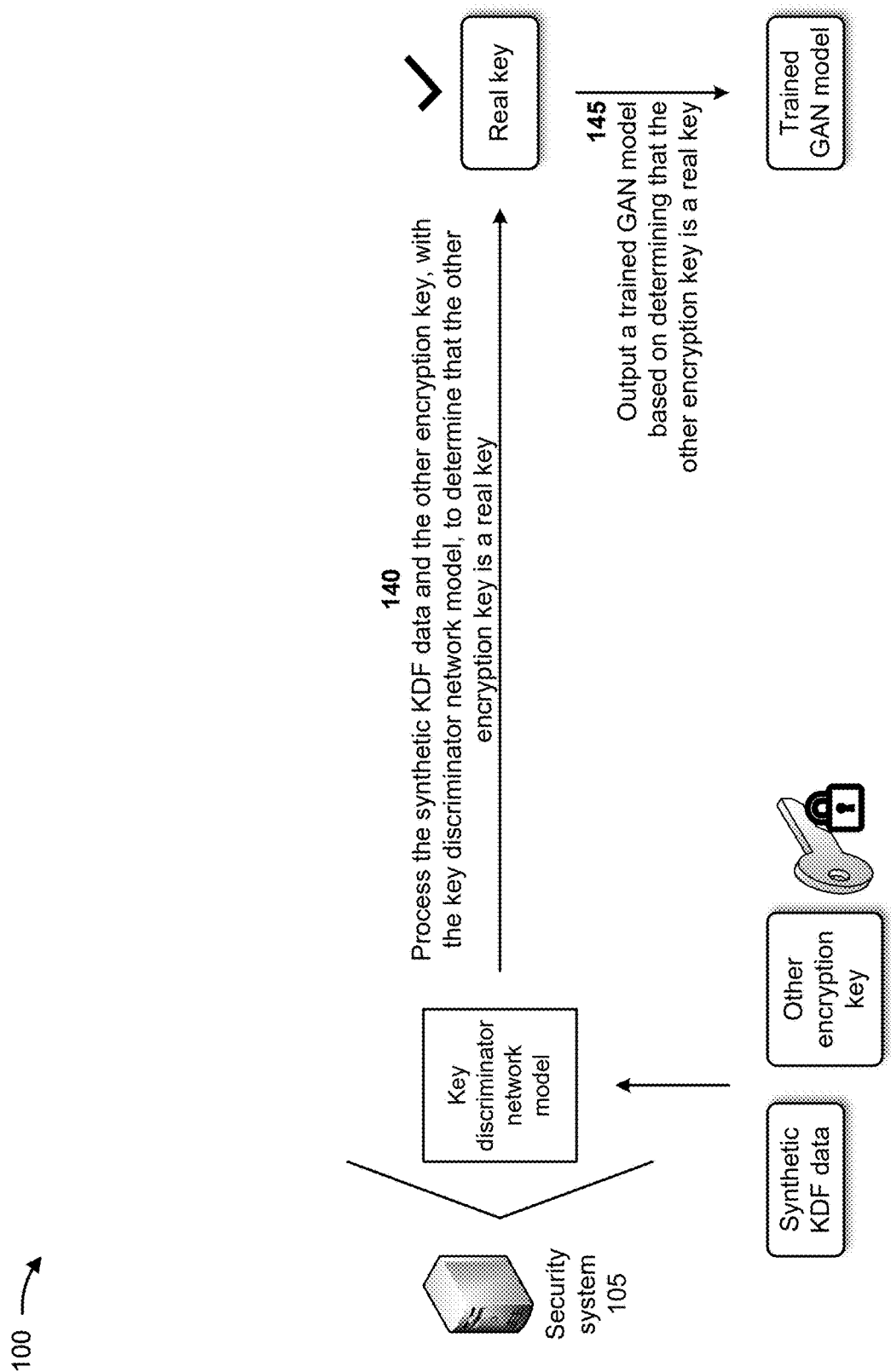

As shown in FIG. 1E, and by reference number 140, the security system 105 may process the synthetic KDF data and the other encryption key, with the key discriminator network model, to determine that the other encryption key is a real key. For example, the security system 105 may process the synthetic KDF data and the other encryption key, with the key discriminator network model, to determine whether the other encryption key is a fake key or a real key. In some implementations, the key discriminator network model may determine that the other encryption key is a fake key. In such implementations, the security system 105 may once again update the key generator network model based on determining that the other encryption key is a fake key and may generate still another encryption key with the updated key generator network model and the input key material.

Alternatively, the key discriminator network model may determine that the other encryption key is a real key. When the other encryption key is determined to be a real key, training may be complete for the GAN model. Thus, the security system 105 may iteratively refine the trained GAN model (e.g., the key generator network model and the key discriminator network model) based on a set quantity of training epochs to achieve a predetermined entropy threshold (e.g., when a generated encryption key is determined to be a real key (i.e., with higher entropy).

As further shown in FIG. 1E, and by reference number 145, the security system 105 may output a trained GAN model based on determining that the other encryption key is a real key. For example, when the security system 105 determines that the other encryption key is a real key, the security system 105 may determine that training is complete for the GAN model and may output the trained GAN model for use with real-time data. The trained GAN model may learn the multiple KDFs during the training process. Further details of training a machine learning model are described below in connection with FIG. 2. In some implementations, the security system 105 may perform a model efficiency measurement by measuring entropies of encryption keys generated by the trained GAN model and comparing the entropies with entropies of the encryption keys used for training the GAN model. The trained GAN model may be efficient when the entropies of the encryption keys generated by the trained GAN model are greater than the entropies of the encryption keys used for training the GAN model.

Figure 1F:
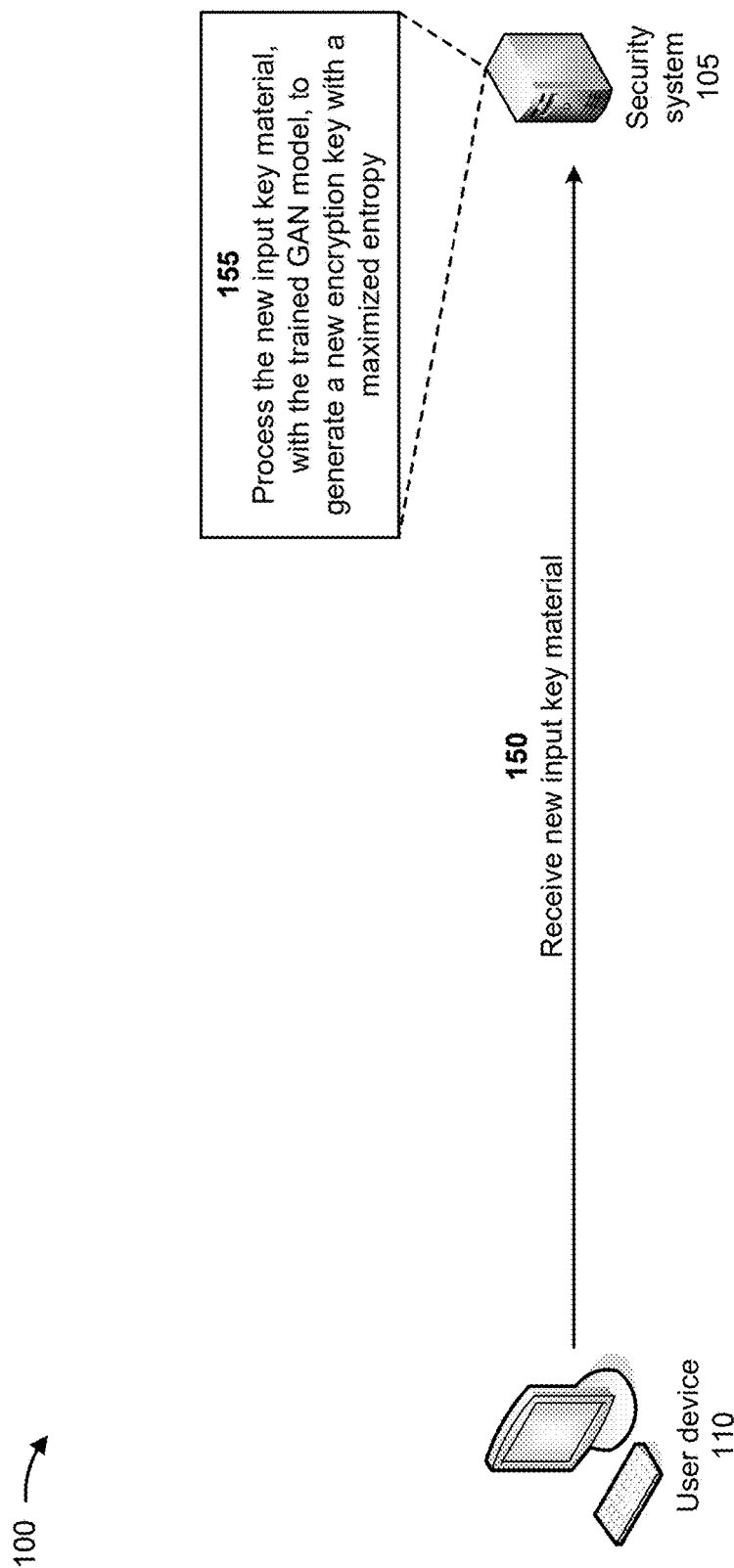

As shown in FIG. 1F, and by reference number 150, the security system 105 may receive new input key material. For example, once the trained GAN model is completed, a user of the user device 110 may cause the user device 110 to generate the new input key material. The user device 110 may provide the new input key material to the security system 105, and the security system 105 may receive the new input key material from the user device 110. In some implementations, the new input key material may include material from one or more language dictionaries, generic strings composition rules (e.g., generic permutations), or personalized strings composition rules (e.g., personalized data permutations).

As further shown in FIG. 1F, and by reference number 155, the security system 105 may process the new input key material, with the trained GAN model, to generate a new encryption key with a maximized entropy. For example, the security system 105 may process the input key material, with the trained key generator network model, to generate the new encryption key. The security system 105 may process the synthetic KDF data and the new encryption key, with the trained key discriminator network model, to determine that the new encryption key is a real key. In some implementations, the trained key generator network model generates the new encryption key with increased entropy based on input key material. The new encryption key may generalize the multiple KDFs with higher entropy to enhance cryptographic security of the new encryption key. The trained key discriminator network model may update the key generator network model to iteratively increase the entropy of generated encryption keys until the maximized entropy is achieved.

Figure 1G:
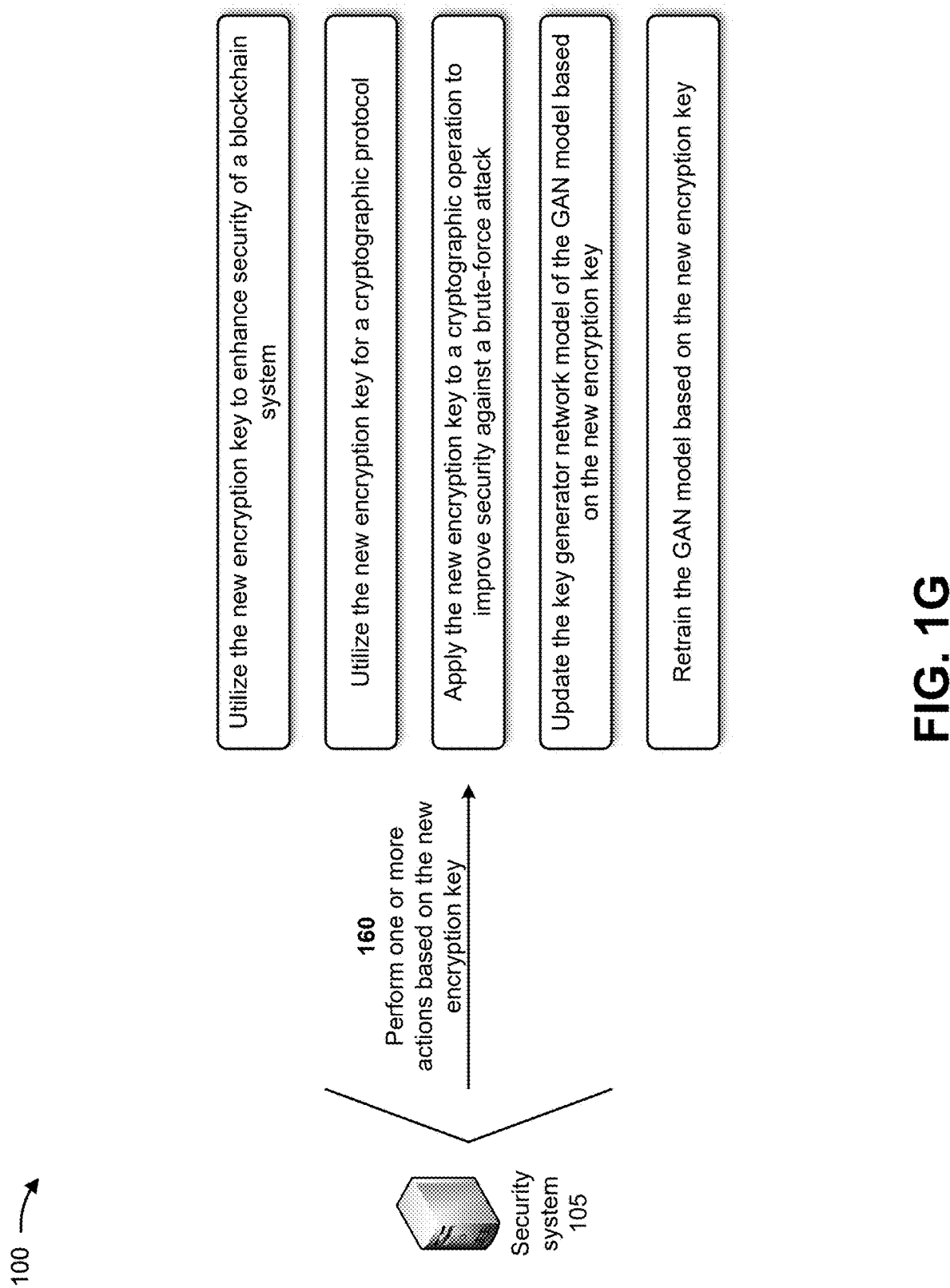

As shown in FIG. 1G, and by reference number 160, the security system 105 may perform one or more actions based on the new encryption key. In some implementations, performing the one or more actions includes the security system 105 utilizing the new encryption key to enhance security of a blockchain system. For example, a blockchain system may include a chain of blocks that contain information, and using a hash to protect the blocks is not enough to avoid tampering with the information. The security system 105 may utilize the new encryption key to encrypt and protect the information included in the chain of blocks of the blockchain system. The new encryption key may prevent tampering with the information and may enhance the security of the blockchain system. In this way, the security system 105 conserves computing resources, networking resources, and/or other resources that would have otherwise been consumed by failing to prevent advanced attacks on secure information.

In some implementations, performing the one or more actions includes the security system 105 utilizing the new encryption key for a cryptographic protocol. For example, many cryptographic protocols require a procedure that encodes an arbitrary input (e.g., a password) to a point on an elliptic curve. This procedure is known as hashing to an elliptic curve. The procedure provides collision resistance and does not reveal a discrete logarithm of an output point. However, selecting a precise hash function that is suitable for a given protocol is often unclear, and an incorrect selection of a hash function can have disastrous consequences for security. Instead of utilizing the hashing to an elliptic curve procedure, the security system 105 may utilize the new encryption key for the cryptographic protocols that require the procedure that encodes the arbitrary input. In this way, the security system 105 conserves computing resources, networking resources, and/or other resources that would have otherwise been consumed by failing to eliminate vulnerabilities introduced into the secure information.

In some implementations, performing the one or more actions includes the security system 105 applying the new encryption key to a cryptographic operation to improve security against a brute-force attack. For example, since the entropy of the new encryption key is maximized by the trained GAN model, the security system 105 may apply the new encryption key to a cryptographic operation that requires security against a brute-force attack. The maximized entropy of the new encryption key may protect the cryptographic operation against the brute-force attack. In this way, the security system 105 conserves computing resources, networking resources, and/or other resources that would have otherwise been consumed by handling loss of the secure information to bad actors.

In some implementations, performing the one or more actions includes the security system 105 updating the key generator network model of the GAN model based on the new encryption key. For example, the security system 105 may utilize the new encryption key to adjust the input key material, the loss function, and/or the noise processed by the key generator network model. In some implementations, the security system 105 may utilize the new encryption key as feedback from the key discriminator network model to the key generator network model. The key generator network model may utilize the feedback to create encryption keys classified as real keys by the key discriminator network model. In this way, the security system 105 conserves computing resources, networking resources, and/or other resources that would have otherwise been consumed by failing to identify and prevent attacks on the secure information.

In some implementations, performing the one or more actions includes the security system 105 retraining the GAN model based on the new encryption key. For example, the security system 105 may utilize the new encryption key as additional training data for retraining the GAN model, thereby increasing the quantity of training data available for training the GAN model. Accordingly, the security system 105 may conserve computing resources associated with identifying, obtaining, and/or generating historical data for training the GAN model, relative to other systems for identifying, obtaining, and/or generating historical data for training GAN models.

In this way, the security system 105 utilizes a GAN model to generate encryption keys with maximum entropy. For example, the security system 105 may include a key generator network model of a GAN model that generates encryption keys with increased entropy based on input key material and noise data. The GAN model may be trained to produce encryption keys that generalize KDFs with higher entropy to enhance cryptographic security of the encryption keys. The security system 105 may include a key discriminator network model of the GAN model that updates the key generator network model to iteratively increase the entropy of generated encryption keys. The security system 105 may enhance the randomness and unpredictability in encryption key derivation and may improve security and performance of the encryption keys. Thus, the security system 105 may conserve computing resources, networking resources, and/or other resources that would have otherwise been consumed by failing to prevent advanced attacks on secure information, failing to eliminate vulnerabilities introduced into the secure information, handling loss of the secure information to bad actors, failing to identify and prevent attacks on the secure information, and/or the like.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2:
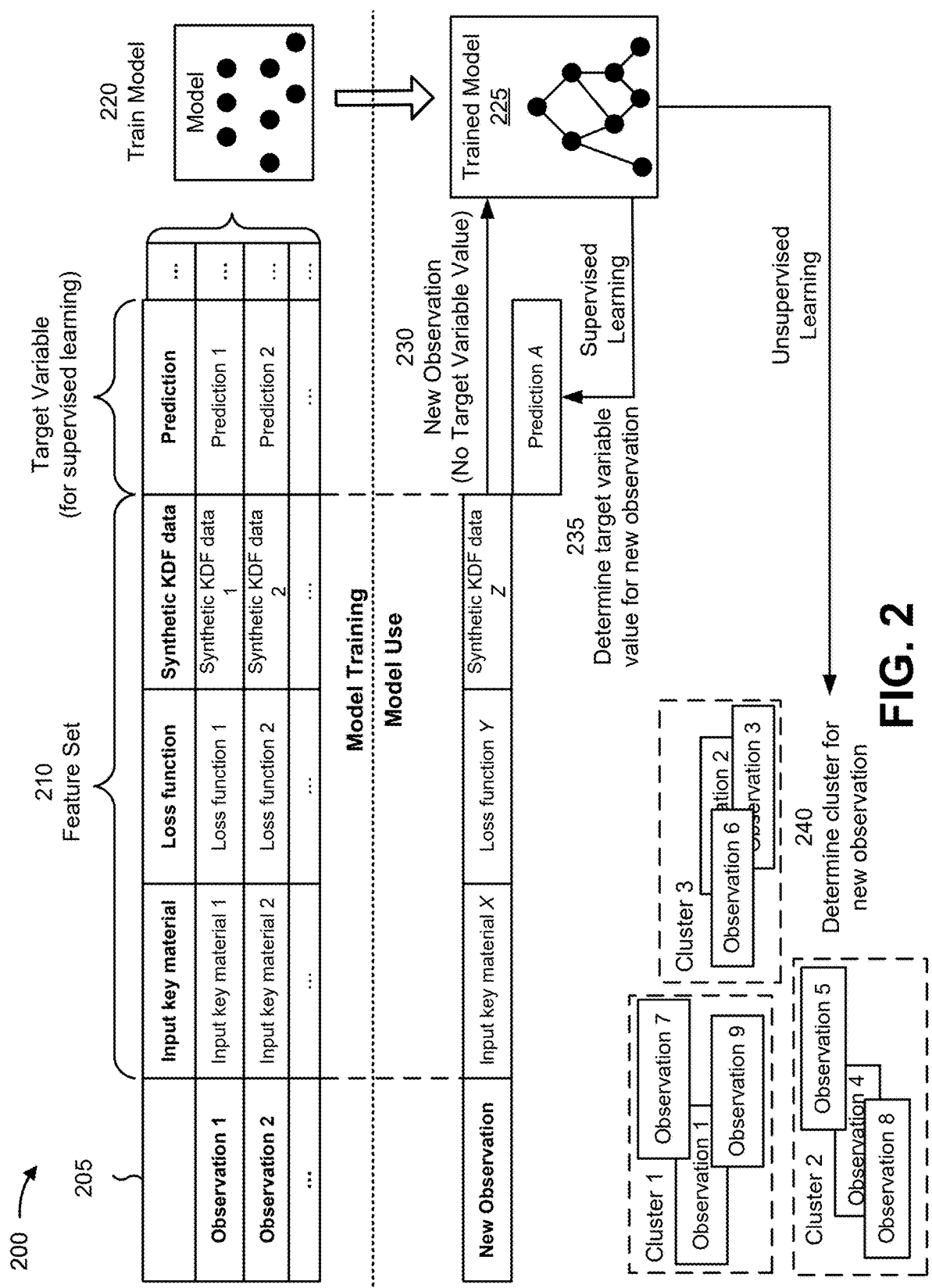
FIG. 2 is a diagram illustrating an example of training and using a machine learning model.

FIG. 2 is a diagram illustrating an example 200 of training and using a machine learning model. The machine learning model training and usage described herein may be performed using a machine learning system. The machine learning system may include or may be included in a computing device, a server, a cloud computing environment, or the like, such as the security system 105.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input) from the security system 105, as described elsewhere herein.

As shown by reference number 210, the set of observations may include a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the security system 105. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of input key material, a second feature of a loss function, a third feature of synthetic KDF data, and so on. As shown, for a first observation, the first feature may have a value of input key material 1, the second feature may have a value of loss function 1, the third feature may have a value of synthetic KDF data 1, and so on. These features and feature values are provided as examples, and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 200, the target variable is a prediction, which has a value of prediction 1 for the first observation. The feature set and target variable described above are provided as examples, and other examples may differ from what is described above.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of input key material X, a second feature of loss function Y, a third feature of synthetic KDF data Z, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of prediction A for the target variable of prediction for the new observation, as shown by reference number 235. Based on this prediction, the machine learning system may provide a first recommendation, may provide output for determination of a first recommendation, may perform a first automated action, and/or may cause a first automated action to be performed (e.g., by instructing another device to perform the automated action), among other examples.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., an input key material cluster), then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster.

As another example, if the machine learning system were to classify the new observation in a second cluster (e.g., a loss function cluster), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified.

In some implementations, the trained machine learning model 225 may be re-trained using feedback information. For example, feedback may be provided to the machine learning model. The feedback may be associated with actions performed based on the recommendations provided by the trained machine learning model 225 and/or automated actions performed, or caused, by the trained machine learning model 225. In other words, the recommendations and/or actions output by the trained machine learning model 225 may be used as inputs to re-train the machine learning model (e.g., a feedback loop may be used to train and/or update the machine learning model).

In this way, the machine learning system may apply a rigorous and automated process to generate encryption keys with maximum entropy. The machine learning system may enable recognition and/or identification of tens, hundreds, thousands, or millions of features and/or feature values for tens, hundreds, thousands, or millions of observations, thereby increasing accuracy and consistency and reducing delay associated with generating encryption keys with maximum entropy relative to requiring computing resources to be allocated for tens, hundreds, or thousands of operators to manually generate encryption keys with maximum entropy.

As indicated above, FIG. 2 is provided as an example. Other examples may differ from what is described in connection with FIG. 2.

Figure 3:
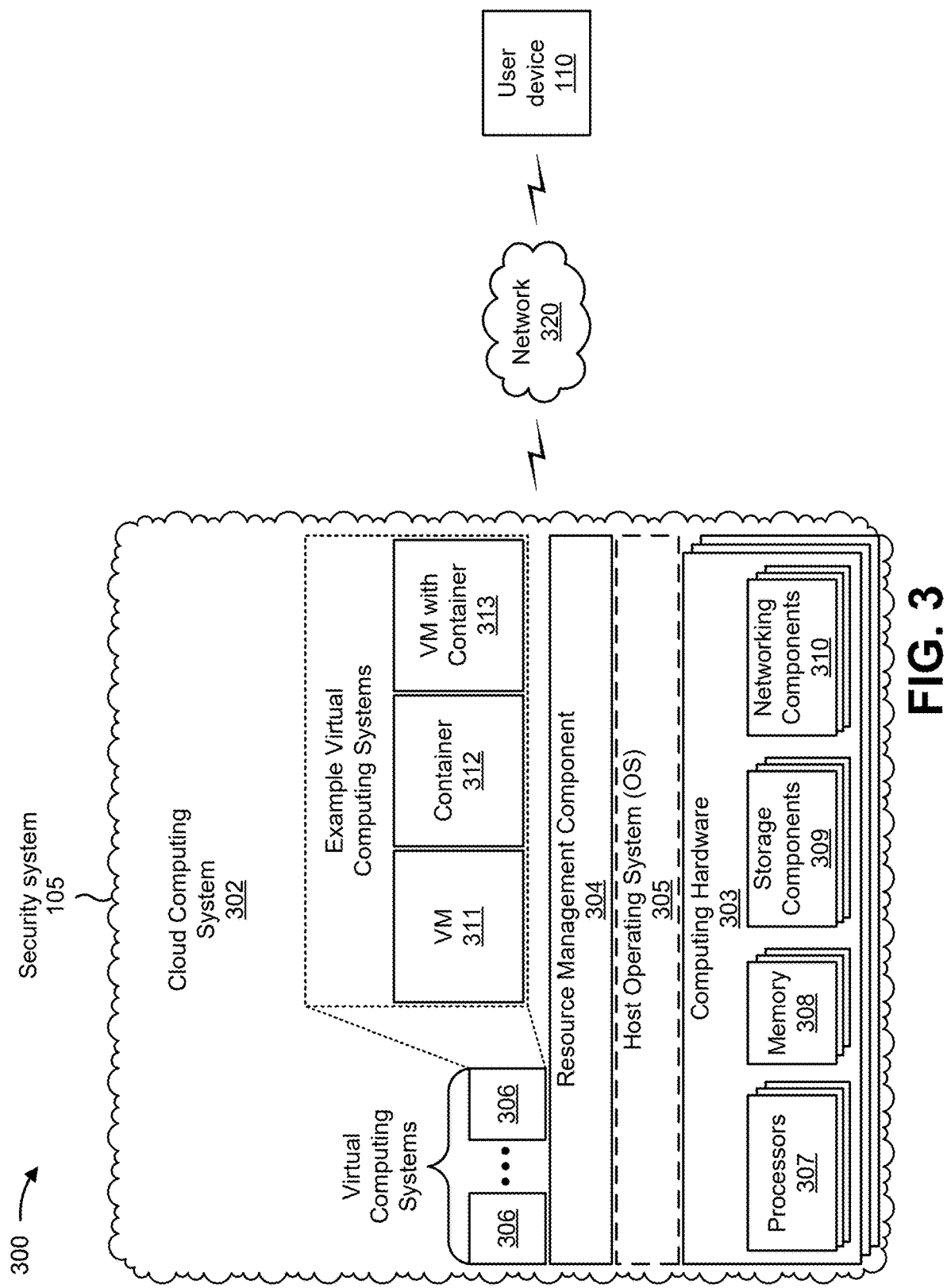
FIG. 3 is a diagram of an example environment in which systems and/or methods described herein may be implemented.

FIG. 3 is a diagram of an example environment 300 in which systems and/or methods described herein may be implemented. As shown in FIG. 3, the environment 300 may include the security system 105, which may include one or more elements of and/or may execute within a cloud computing system 302. The cloud computing system 302 may include one or more elements 303-313, as described in more detail below. As further shown in FIG. 3, the environment 300 may include the user device 110 and/or a network 320. Devices and/or elements of the environment 300 may interconnect via wired connections and/or wireless connections.

The user device 110 may include one or more devices capable of receiving, generating, storing, processing, and/or providing information, as described elsewhere herein. The user device 110 may include a communication device and/or a computing device. For example, the user device 110 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The cloud computing system 302 includes computing hardware 303, a resource management component 304, a host operating system (OS) 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of the computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from the computing hardware 303 of the single computing device. In this way, the computing hardware 303 can operate more efficiently, with lower power consumption, higher reliability, higher availability, higher utilization, greater flexibility, and lower cost than using separate computing devices.

The computing hardware 303 includes hardware and corresponding resources from one or more computing devices. For example, the computing hardware 303 may include hardware from a single computing device (e.g., a single server) or from multiple computing devices (e.g., multiple servers), such as multiple computing devices in one or more data centers. As shown, the computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as the computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using the computing hardware 303. As shown, the virtual computing system 306 may include a virtual machine 311, a container 312, or a hybrid environment 313 that includes a virtual machine and a container, among other examples. The virtual computing system 306 may execute one or more applications using a file system that includes binary files, software libraries, and/or other resources required to execute applications on a guest operating system (e.g., within the virtual computing system 306) or the host operating system 305.

Although the security system 105 may include one or more elements 303-313 of the cloud computing system 302, may execute within the cloud computing system 302, and/or may be hosted within the cloud computing system 302, in some implementations, the security system 105 may not be cloud-based (e.g., may be implemented outside of a cloud computing system) or may be partially cloud-based. For example, the security system 105 may include one or more devices that are not part of the cloud computing system 302, such as a device 400 of FIG. 4, which may include a standalone server or another type of computing device. The security system 105 may perform one or more operations and/or processes described in more detail elsewhere herein.

The network 320 includes one or more wired and/or wireless networks. For example, the network 320 may include a cellular network, a public land mobile network (PLMN), a local area network (LAN), a wide area network (WAN), a private network, the Internet, and/or a combination of these or other types of networks. The network 320 enables communication among the devices of the environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
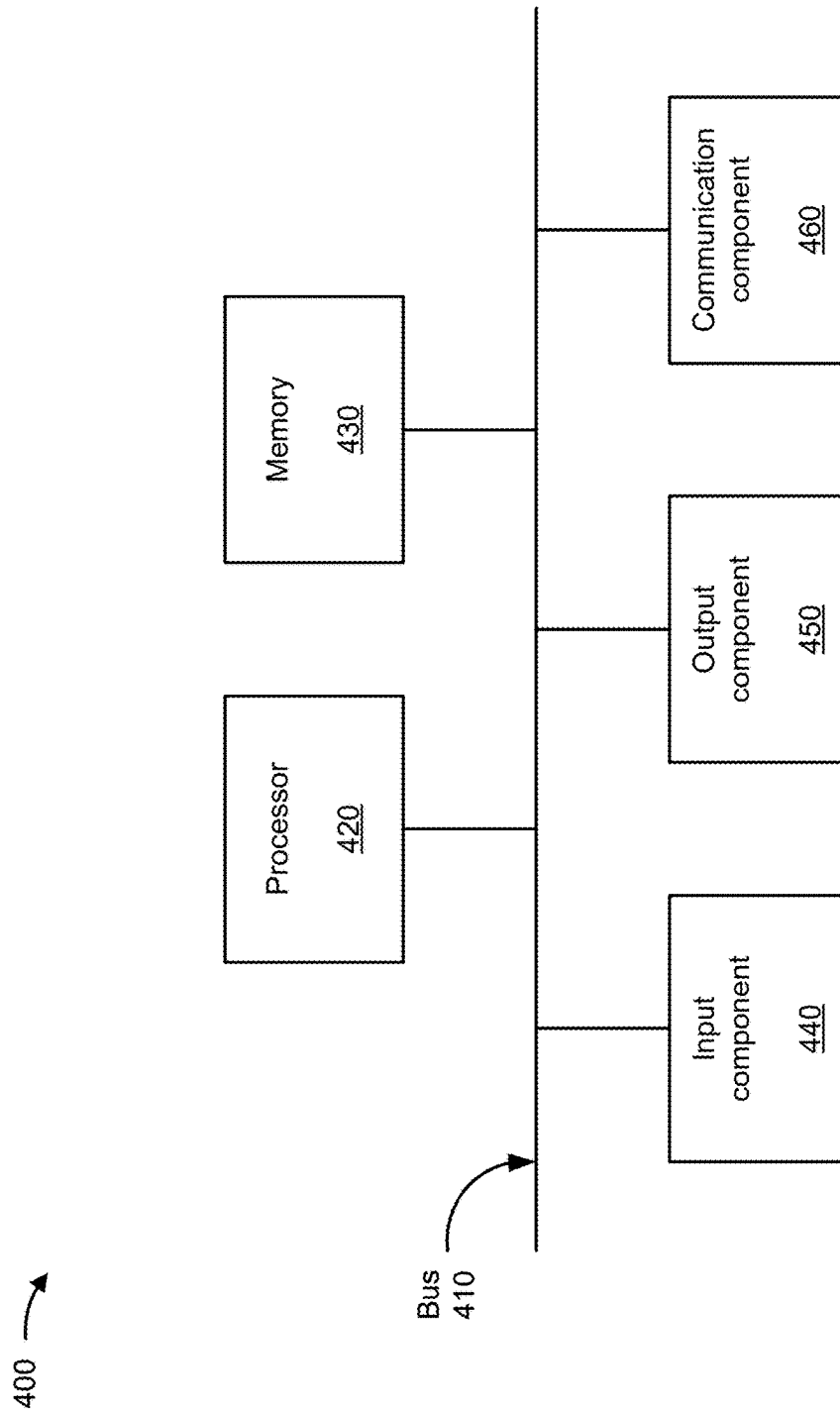
FIG. 4 is a diagram of example components of one or more devices of FIG. 3.

FIG. 4 is a diagram of example components of a device 400, which may correspond to the security system 105 and/or the user device 110. In some implementations, the security system 105 and/or the user device 110 may include one or more devices 400 and/or one or more components of the device 400. As shown in FIG. 4, the device 400 may include a bus 410, a processor 420, a memory 430, an input component 440, an output component 450, and a communication component 460.

The bus 410 includes one or more components that enable wired and/or wireless communication among the components of the device 400. The bus 410 may couple together two or more components of FIG. 4, such as via operative coupling, communicative coupling, electronic coupling, and/or electric coupling. The processor 420 includes a central processing unit, a graphics processing unit, a microprocessor, a controller, a microcontroller, a digital signal processor, a field-programmable gate array, an application-specific integrated circuit, and/or another type of processing component. The processor 420 is implemented in hardware, firmware, or a combination of hardware and software. In some implementations, the processor 420 includes one or more processors capable of being programmed to perform one or more operations or processes described elsewhere herein.

The memory 430 includes volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 stores information, instructions, and/or software (e.g., one or more software applications) related to the operation of the device 400. In some implementations, the memory 430 includes one or more memories that are coupled to one or more processors (e.g., the processor 420), such as via the bus 410.

The input component 440 enables the device 400 to receive input, such as user input and/or sensed input. For example, the input component 440 may include a touch screen, a keyboard, a keypad, a mouse, a button, a microphone, a switch, a sensor, a global positioning system sensor, an accelerometer, a gyroscope, and/or an actuator. The output component 450 enables the device 400 to provide output, such as via a display, a speaker, and/or a light-emitting diode. The communication component 460 enables the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., the memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
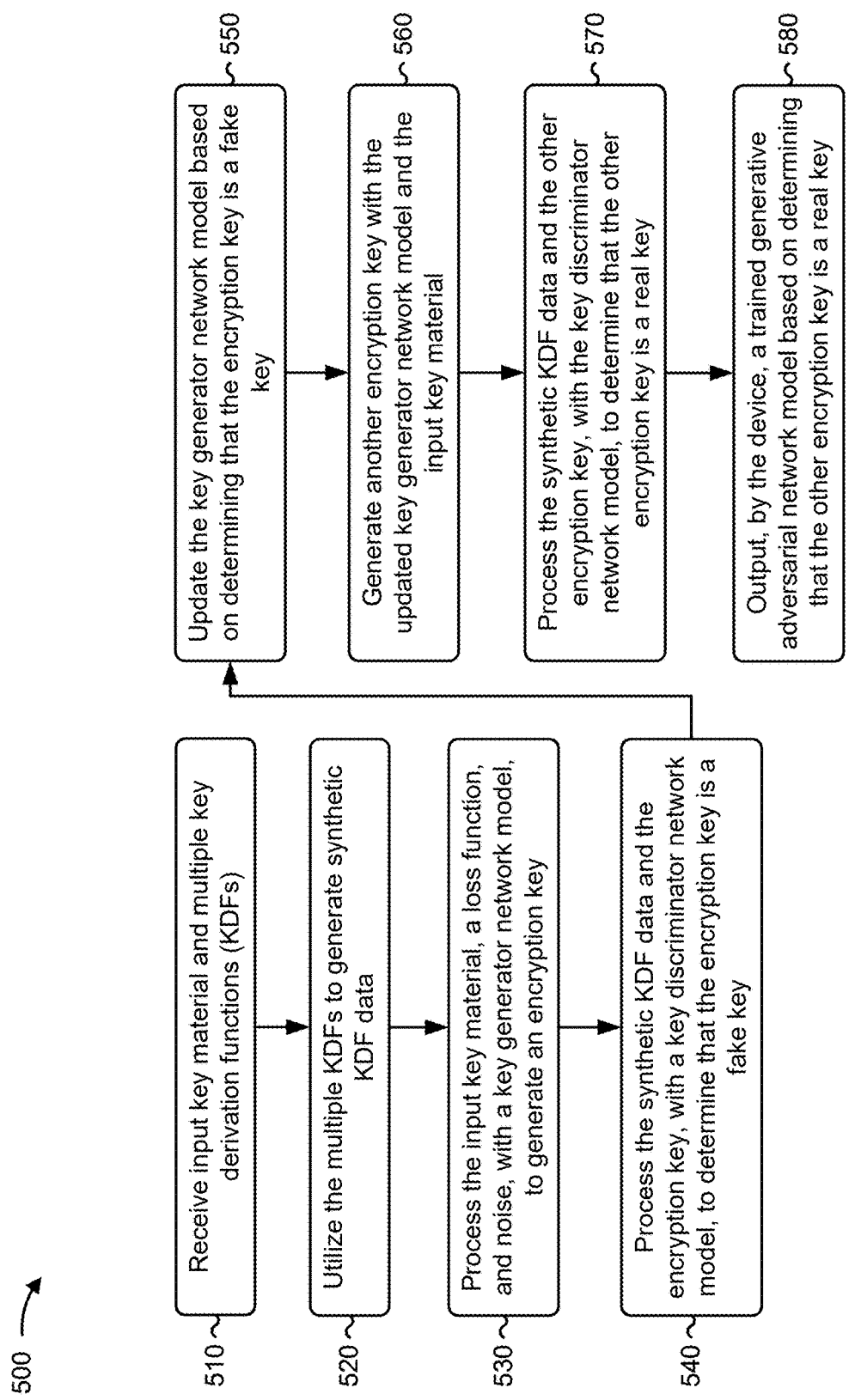
FIG. 5 is a flowchart of an example process for utilizing a GAN model to generate encryption keys with maximum entropy.

FIG. 5 depicts a flowchart of an example process 500 for utilizing a GAN model to generate encryption keys with maximum entropy. In some implementations, one or more process blocks of FIG. 5 may be performed by a device (e.g., the security system 105). In some implementations, one or more process blocks of FIG. 5 may be performed by another device or a group of devices separate from or including the device. Additionally, or alternatively, one or more process blocks of FIG. 5 may be performed by one or more components of the device 400, such as the processor 420, the memory 430, the input component 440, the output component 450, and/or the communication component 460.

As shown in FIG. 5, process 500 may include receiving input key material and multiple KDFs (block 510). For example, the device may receive input key material and multiple KDFs, as described above. In some implementations, the multiple KDFs include one or more of a hash function, a block cipher, or a pseudorandom function. In some implementations, the input key material includes one or more of material from a language dictionary, generic strings composition rules, or personalized strings composition rules.

As further shown in FIG. 5, process 500 may include utilizing the multiple KDFs to generate synthetic KDF data (block 520). For example, the device may utilize the multiple KDFs to generate synthetic KDF data, as described above.

As further shown in FIG. 5, process 500 may include processing the input key material, a loss function, and noise, with a key generator network model, to generate an encryption key (block 530). For example, the device may process the input key material, a loss function, and noise, with a key generator network model of a GAN model, to generate an encryption key, as described above. In some implementations, the GAN model includes one of a vanilla GAN model, a Hellinger GAN model, a Wasserstein GAN model, or a Sinkhorn GAN model.

As further shown in FIG. 5, process 500 may include processing the synthetic KDF data and the encryption key, with a key discriminator network model, to determine that the encryption key is a fake key (block 540). For example, the device may process the synthetic KDF data and the encryption key, with a key discriminator network model of the GAN model, to determine that the encryption key is a fake key, as described above.

As further shown in FIG. 5, process 500 may include updating the key generator network model based on determining that the encryption key is a fake key (block 550). For example, the device may update the key generator network model based on determining that the encryption key is a fake key, as described above.

As further shown in FIG. 5, process 500 may include generating another encryption key with the updated key generator network model and the input key material (block 560). For example, the device may generate another encryption key with the updated key generator network model and the input key material, as described above.

As further shown in FIG. 5, process 500 may include processing the synthetic KDF data and the other encryption key, with the key discriminator network model, to determine that the other encryption key is a real key (block 570). For example, the device may process the synthetic KDF data and the other encryption key, with the key discriminator network model, to determine that the other encryption key is a real key, as described above.

As further shown in FIG. 5, process 500 may include outputting a trained GAN model based on determining that the other encryption key is a real key (block 580). For example, the device may output a trained GAN model based on determining that the other encryption key is a real key, as described above.

In some implementations, process 500 includes receiving new input key material, processing the new input key material, with the trained GAN model, to generate a new encryption key with a maximized entropy, and performing one or more actions based on the new encryption key. In some implementations, performing the one or more actions includes one or more of utilizing the new encryption key to enhance security of a blockchain system, or utilizing the new encryption key for a cryptographic protocol. In some implementations, performing the one or more actions includes one or more of applying the new encryption key to a cryptographic operation to improve security against a brute-force attack, or updating the key generator network model of the GAN model based on the new encryption key. In some implementations, performing the one or more actions includes one or more of retraining the GAN model based on the new encryption key, retraining the key generator network model of the GAN model based on the new encryption key, or retraining the key discriminator network model of the GAN model based on the new encryption key. In some implementations, process 500 includes receiving new input key material, and updating the key generator network model based on the new input key material to improve entropies of encryption keys generated by the key generator network model. In some implementations, process 500 includes iteratively refining the trained GAN model based on a set quantity of training epochs to achieve a predetermined entropy threshold.

In some implementations, processing the input key material, with the trained GAN model, to generate the encryption key with the maximized entropy includes processing the input key material, a loss function, and noise, with the trained generative adversarial network model, to generate the encryption key with the maximized entropy. In some implementations, the loss function is based on parameterized Renyi entropy. In some implementations, the loss function includes one of a Kullback-Leibler divergence loss function, a Jensen-Shannon divergence loss function, or a Wasserstein loss function. In some implementations, the noise is incorporated into the input key material.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a device, input key material and multiple key derivation functions;
   utilizing, by the device, the multiple key derivation functions to generate synthetic key derivation function data;
   processing, by the device, the input key material, a loss function, and noise, with a key generator network model, to generate an encryption key,
      wherein the key generator network model is part of a generative adversarial network model that includes a key discriminator network model;
   processing, by the device, the synthetic key derivation function data and the encryption key, with the key discriminator network model, to determine that the encryption key is a fake key;
   updating, by the device, the key generator network model based on determining that the encryption key is a fake key;
   generating, by the device, another encryption key with the updated key generator network model and the input key material;
   processing, by the device, the synthetic key derivation function data and the other encryption key, with the key discriminator network model, to determine that the other encryption key is a real key; and
   outputting, by the device, a trained generative adversarial network model based on determining that the other encryption key is a real key.

2. The method of claim 1, further comprising:
   receiving new input key material;
   processing the new input key material, with the trained generative adversarial network model, to generate a new encryption key with a maximized entropy; and
   performing one or more actions based on the new encryption key.

3. The method of claim 2, wherein performing the one or more actions includes one or more of:
   utilizing the new encryption key to enhance security of a blockchain system; or
   utilizing the new encryption key for a cryptographic protocol.

4. The method of claim 2, wherein performing the one or more actions includes one or more of:
   applying the new encryption key to a cryptographic operation to improve security against a brute-force attack; or
   updating the key generator network model of the generative adversarial network model based on the new encryption key.

5. The method of claim 2, wherein performing the one or more actions includes one or more of:
   retraining the generative adversarial network model based on the new encryption key;
   retraining the key generator network model of the generative adversarial network model based on the new encryption key; or
   retraining the key discriminator network model of the generative adversarial network model based on the new encryption key.

6. The method of claim 1, wherein the multiple key derivation functions include one or more of a hash function, a block cipher, or a pseudorandom function.

7. The method of claim 1, further comprising:
   receiving new input key material; and
   updating the key generator network model based on the new input key material to improve entropies of encryption keys generated by the key generator network model.

8. A device, comprising:
   one or more processors configured to:
      receive input key material and multiple key derivation functions;

utilize the multiple key derivation functions to generate synthetic key derivation function data;
process the input key material, a loss function, and noise, with a key generator network model, to generate an encryption key,
wherein the key generator network model is part of a generative adversarial network model that includes
a key discriminator network model;
process the synthetic key derivation function data and the encryption key, with the key discriminator network model, to determine that the encryption key is a fake key;
update the key generator network model based on determining that the encryption key is a fake key;
generate another encryption key with the updated key generator network model and the input key material;
process the synthetic key derivation function data and the other encryption key, with the key discriminator network model, to determine that the other encryption key is a real key; and
output a trained generative adversarial network model based on determining that the other encryption key is a real key.

9. The device of claim 8, wherein the one or more processors are further configured to:
receive new input key material; and
process the new input key material, with the trained generative adversarial network model, to generate a new encryption key with a maximized entropy.

10. The device of claim 8, wherein the loss function is based on parameterized Renyi entropy.

11. The device of claim 8, wherein the loss function includes one of a Kullback-Leibler divergence loss function, a Jensen-Shannon divergence loss function, or a Wasserstein loss function.

12. The device of claim 8, wherein the noise is incorporated into the input key material.

13. The device of claim 8, wherein the one or more processors are further configured to:
iteratively refine the trained generative adversarial network model based on a set quantity of training epochs to achieve a predetermined entropy threshold.

14. The device of claim 8, wherein the input key material includes one or more of material from a language dictionary, generic strings composition rules, or personalized strings composition rules.

15. A non-transitory computer-readable medium storing a set of instructions, the set of instructions comprising:
one or more instructions that, when executed by one or more processors of a device, cause the device to:
receive input key material and multiple key derivation functions;
utilize the multiple key derivation functions to generate synthetic key derivation function data;
process the input key material, a loss function, and noise, with a key generator network model, to generate an encryption key,
wherein the key generator network model is part of a generative adversarial network (GAN) model that includes a key discriminator network model,
wherein the GAN model includes one of a vanilla GAN model, a Hellinger GAN model, a Wasserstein GAN model, or a Sinkhorn GAN model;
process the synthetic key derivation function data and the encryption key, with the key discriminator network model, to determine that the encryption key is a fake key;
update the key generator network model based on determining that the encryption key is a fake key;
generate another encryption key with the updated key generator network model and the input key material;
process the synthetic key derivation function data and the other encryption key, with the key discriminator network model, to determine that the other encryption key is a real key; and
output a trained GAN model based on determining that the other encryption key is a real key.

16. The non-transitory computer-readable medium of claim 15, wherein the one or more instructions further cause the device to:
receive new input key material;
process the new input key material, with the trained GAN model, to generate a new encryption key with a maximized entropy; and
perform one or more actions based on the new encryption key.

17. The non-transitory computer-readable medium of claim 15, wherein the multiple key derivation functions include one or more of a hash function, a block cipher, or a pseudorandom function.

18. The non-transitory computer-readable medium of claim 15, wherein the one or more instructions further cause the device to:
receive new input key material; and
update the key generator network model based on the new input key material to improve entropies of encryption keys generated by the key generator network model.

19. The non-transitory computer-readable medium of claim 15, wherein the one or more instructions, that cause the device to process the input key material, with the key generator network model of the GAN model, to generate the encryption key, cause the device to:
process the input key material, the loss function, and noise, with the key generator network model of the GAN model, to generate the encryption key.

20. The non-transitory computer-readable medium of claim 15, wherein the one or more instructions further cause the device to:
iteratively refine the trained GAN model based on a set quantity of training epochs to achieve a predetermined entropy threshold.

* * * * *